Feb. 23, 1932.                M. KALISCHER                1,847,006
DRIVING MECHANISM
Filed Feb. 6, 1929
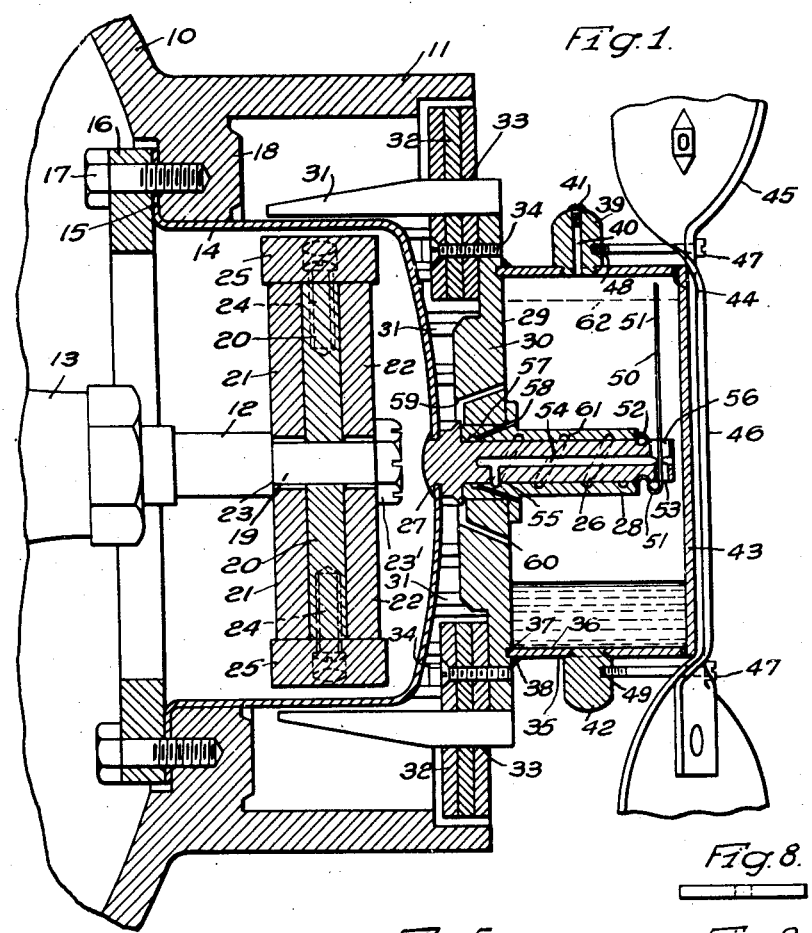
INVENTOR
*Milton Kalischer.*
BY
*Wesley G. Barr*
ATTORNEY Patented Feb. 23, 1932

1,847,006

UNITED STATES PATENT OFFICE

MILTON KALISCHER, OF MANSFIELD, OHIO, ASSIGNOR TO WESTINGHOUSE ELECTRIC & MANUFACTURING COMPANY, A CORPORATION OF PENNSYLVANIA

DRIVING MECHANISM

Application filed February 6, 1929. Serial No. 338,013.

This invention relates to driving mechanisms and particularly to that form of mechanism wherein the driving and driven parts do not make actual frictional contact but operate together solely by magnetic or inductive action.

The invention is particularly adapted to a clutch mechanism wherein either the driving or the driven member is enclosed in a sealed casing and the other member is outside the casing, whereby the motion of one part is transmitted, either magnetically or inductively, to the other part.

More specifically, this invention relates to an apparatus wherein a motor and a compressor for a refrigerating apparatus are enclosed in a hermetically sealed casing to prevent leakage of gas, the fan for forcing air over the condenser and motor-compressor casing being disposed outside, but actuated by, the compressor-driving motor.

It is an object of this invention to provide, in such a structure, a clutching mechanism which has a relatively small power consumption, as compared with that required by the use of a separate motor for driving the fan.

A further object is to provide a magnetic clutch which will operate through a wall of the casing with relatively small loss of flux and with a minimum reluctance by having a minimum air gap and maximum cross-sectional area between the driving and the driven parts.

A still further object of this invention is to provide a driving mechanism for a fan which will operate with a minimum amount of noise and in which the fan may be operated at a lesser speed than the driving motor.

Another object of my invention is to provide a self-lubricating system for portions of my apparatus which will be effective upon operation of the device.

Other objects and advantages of the invention will be readily apparent from the drawings and the following description wherein:

Figure 1 is a fragmentary longitudinal section through a sealed casing along the axis of the magnetic clutch;

Fig. 2 is a plan view of the secondary rotor element;

Fig. 3 is a view in section on the line 3—3 of Fig. 2;

Fig. 4 is a plan view of a secondary rotor disc;

Fig. 5 is a sectional view on the line 5—5 of Fig. 4;

Fig. 6 is an elevational view and Fig. 7 is a plan view of the lubricating and locking pin;

Figs. 8 and 9 are elevational and plan views, respectively, of a permanent magnet used on the primary rotor element; and Figs. 10 and 11 are elevational and plan views, respectively, of the non-magnetic portion and pole pieces of the primary rotor element.

In the drawings, 10 designates a casing adapted to contain a motor and a compressor (not shown). The casing is provided with a cylindrical extension 11 into which projects the extension 12 of the driving-motor shaft 13. The casing is sealed at this end by means of a cup-shaped, non-magnetic wall 14 provided with a flange 15 which is retained against a flange 18 provided on the casing 10 by means of a ring 16 and bolts 17.

The extension 12 of the driving-motor shaft is provided with a reduced portion 19 over which is fitted a non-magnetic bar 20 interposed between permanent magnets 21 and 22. The inner magnet bar 21 engages a shoulder 23 provided on the extension 12, and the two magnets and interposed bar 20 are clamped tightly against this shoulder by means of a nut 23'. The non-magnetic bar 20 is made of a relatively soft material, such as brass, which is easily machined, and it fits tightly on the extension 19, whereas the magnets 21 and 22, which are made of a hard material, for example, cobalt steel, are punched slightly larger than the shaft and fit loosely thereon.

The bar 20 carries, at its outer ends, by means of screws 24, pole pieces 25, which have curved outer surfaces, as is clearly shown in Fig. 11. The pole pieces are of a width sufficient to engage the entire outer end of each of the magnets 21 and 22 when the screws 24 are tightly drawn. In order that there shall be no looseness between the pole shoes and the magnet, the bar 20 is made slightly shorter than the magnet bars, thereby ensuring a close contact between the shoes and magnets when the screws 24 are drawn up.

A stub-shaped shaft or bearing pin 26 extends axially outward from the cup-shaped wall 14 and is rigidly riveted thereto in a gas-tight manner, as indicated at 27. This shaft serves as the sole support for the secondary rotor element 29.

The shaft 26 has a sleeve 28 rotatably mounted thereon which carries the secondary rotor element 29. The element 29 which is made, preferably, of steel or other magnetic material, comprises a circular plate 30, carrying, at spaced intervals on its periphery, a plurality of axially extending teeth 31, as shown in Figs. 1, 2 and 3.

A plurality of discs 32 are carried by the rotor element 29 and are provided with openings 33, by means of which they are stacked on the teeth 31. The discs 32, which must be of good conducting material, such for example, as aluminum, are retained tightly against the rotor element 29 by suitable means, such as screws 34.

An oil reservoir for the bearing sleeve 28 is provided by a cup-shaped member 35. The reservoir comprises a cylindrical portion 36 which is placed in a groove 37 provided in the outer surface of rotor element 29 and then soldered or welded thereto, as indicated at 38. The reservoir is provided with a plug 39 having a threaded bore 40 which is normally closed by a screw 41. The bored plug 39 serves as a means for filling or draining the reservoir. A plug 42, placed diametrically opposite plug 39, serves as a counter-balance to said plug 39.

The outer end of the reservoir is closed by a circular plate 43, and a sealing gasket 44 is interposed between this plate and the cylindrical portion 36.

The reservoir 35 also carries the condenser-cooling fan 45. The fan is provided with a flattened portion 46 that is adapted to bear against the plate 43 and is retained rigidly in position by means of screws 47 which extend into screw-threaded openings 48 and 49 provided in the plugs 39 and 42, respectively.

When the screws 47 are drawn, the fan 45 and cover plate 43 are retained against the cylindrical portion 36 of reservoir 35.

The sleeve 28 and the secondary rotor element 29 are retained against longitudinal movement on the shaft 26 by means of an upright pin 50 (Figs. 6 and 7) which has a curved portion 51 fitting in a groove 52 provided at the outer end of shaft 26 and a straight portion 51' extending vertically upward through a bore 53 also provided on the outer end of the shaft. The pin 50, in addition to retaining the sleeve on the shaft, also serves to convey lubricant to the moving parts, in a manner to be hereafter described.

The shaft 26 is provided with an axially-extending bore 54 which communicates, at its inner end, with a radial passage 55 leading to the bearing surface between the sleeve 28 and the shaft 26. As the reservoir 35 rotates, lubricant contained therein is carried around by centrifugal force, and the outer end of pin 50 becomes immersed in lubricant, some of which is carried vertically down the pin, by gravity, to the recess 56 which communicates with the bore 54 and thence, through the bore and passage 55, to the helical groove 61 provided in the sleeve 28 adjacent to the bearing surface of shaft 26.

Some of the lubricant returns to the reservoir from the bearing surface by escaping outwardly through groove 61. Such lubricant as moves axially inward (to the left in Fig. 1) is trapped in a circular groove 57, provided in sleeve 28, from which it is returned, by centrifugal force, through passages 58, to reservoir 35. If any lubricant escapes past groove 57 it is caught on a circular ledge 59 provided on the inner surface of secondary rotor element 29 from which it is returned, by centrifugal force, through grooves 60, to reservoir 35.

The operation of my device is as follows:

As the magnets 21 and 22 and pole pieces 25 rotate, the magnets set up a rotating magnetic field which threads through the wall 14, teeth 31 and main body portion 30 of the secondary rotor element 29.

Rotation of the magnet also causes flux to move circumferentially from one tooth to another, whereby it enters through that portion of the conductor discs 32 which lies between the teeth 31 and induces a voltage. The generated voltage causes a current to flow through the inductors 32, thereby setting up a secondary magnetic field. This field, reacting with the main field from the magnet bars, will cause the secondary rotor element to revolve in the same direction as the magnet 21 and 22.

Rotation of the secondary rotor element will also rotate the lubricant reservoir 35, whereby the lubricant contained therein will be thrown centrifugally to the position illustrated by the dotted line 62 in Fig. 1. The outer end of the pin 50, projecting into the lubricant, will convey a portion thereof to the passages and grooves previously described.

It will thus be apparent that I have provided a magnetic or inductive clutching device, one member of which is adapted to be enclosed within a sealed casing and the other member of which may be placed outside the casing for driving an object, such as a fan, also located outside the casing, without the provision of a separate driving motor therefor.

It will be apparent to those skilled in the art that either the member inside the casing or outside thereof may be the driving member, and that, if either is rotated, the other will follow with a rotating motion.

While I have shown and described one form of my invention, it will be readily apparent that other forms and modifications may be adopted, all coming within the scope of the appended claims.

I claim as my invention:

1. In a magnetic clutch, a member comprising a magnet, a second member comprising a plate having a plurality of teeth extending substantially parallel with the axis of the plate, and a conducting disc carried by the second member and having apertures for receiving said teeth.

2. In a magnetic clutch, a member comprising a shaft, a non-magnetic bar rigidly carried on the shaft, a plurality of magnets also carried on the shaft, pole pieces on each end of the non-magnetic bar a member comprising a toothed plate, the teeth of said plate being situated adjacent to the pole pieces, and an inductor disc carried by said toothed plate and having apertures for receiving said teeth.

3. In a magnetic clutch, a member comprising a shaft, a bar rigidly attached to the shaft, a plurality of bar magnets also carried by the shaft, pole pieces carried by the bar at each end thereof, said pole pieces having curved outer surfaces, a member comprising a plate having a plurality of teeth at its circumference, said teeth extending substantially parallel to the axis of the plate and in proximity to the curved surfaces of the pole pieces, and an inductor disc carried by said toothed plate and having apertures for receiving said disc.

4. In a magnetic clutch, a member comprising a shaft, a relatively soft-metal bar rigidly attached to the shaft, a plurality of bar magnets also carried by the shaft, pole pieces carried by the soft-metal bar at each end thereof, said pole pieces having curved outer surfaces, and a member comprising a plate having a plurality of teeth at its circumference, said teeth extending substantially parallel to the axis of the plate and in proximity to the curved surfaces of the pole pieces, and a plurality of circular inductor discs carried by said toothed plate, said discs having apertures for receiving said teeth.

5. In a magnetic clutch, a shaft, a driving member carried by the shaft, said member comprising a non-magnetic member rigidly carried by the shaft, and a plurality of magnets on the shaft adjacent to the non-magnetic member, pole pieces carried by the non-magnetic member, and a driven member actuated by the rotation of the driving member, said driven member comprising a toothed plate supporting a plurality of inductor discs, said plate provided with a plurality of teeth passing through said discs.

6. In a magnetic clutch, a member comprising a shaft, at least one magnet carried by said shaft, pole pieces in contact with said magnet, said pole pieces having curved outer surfaces, a member comprising a plate having a plurality of axially extending teeth at its periphery, and at least one inductor disc carried by said toothed plate, said teeth extending through apertures formed in said disc.

7. In a magnetic clutch, a member comprising a shaft, at least one magnet carried by said shaft, pole pieces in contact with said magnet, said pole pieces having curved outer surfaces, a member comprising a plate having a plurality of axially extending teeth at its periphery, and at least one inductor disc carried by said toothed plate, said inductor disc provided with a plurality of apertures for receiving said teeth.

8. An inductive driving device comprising driving and driven members, one of said members comprising a magnet the other member comprising a plate having a plurality of axially extending teeth, a conducting disc carried by the toothed plate, said teeth extending through apertures formed in said disc, and a hermetically sealed casing enclosing one of said members.

In testimony whereof, I have hereunto subscribed my name this 28th day of January, 1929.

MILTON KALISCHER.